United States Patent

Tebo

[11] Patent Number: 5,927,923
[45] Date of Patent: Jul. 27, 1999

[54] DECK FASTENERS

[76] Inventor: Glenn J. Tebo, P.O. Box 754, Kingston, N.H. 03848

[21] Appl. No.: 09/059,847

[22] Filed: Apr. 14, 1998

[51] Int. Cl.$^6$ ........................................ F16B 15/00
[52] U.S. Cl. .......................... 411/458; 411/459; 411/470
[58] Field of Search ....................... 411/457, 458, 411/459, 460, 469, 470

[56] References Cited

U.S. PATENT DOCUMENTS

| | | | |
|---|---|---|---|
| 310,678 | 1/1885 | Halstrom | 411/470 X |
| 317,304 | 5/1885 | Condit, Jr. | 411/458 |
| 642,377 | 1/1900 | Smith | 411/459 |
| 712,569 | 11/1902 | Myers | 411/458 |
| 847,888 | 3/1907 | Birdsall | 411/459 |
| 1,510,360 | 9/1924 | Van Rijmenam | 411/457 |
| 2,079,194 | 5/1937 | Williams | 411/458 |
| 2,270,284 | 1/1942 | Faggard | 411/473 |
| 2,620,705 | 12/1952 | Podvinecz et al. | 411/460 |
| 3,071,827 | 1/1963 | Van Buran, Jr. | 411/458 |
| 3,331,180 | 7/1967 | Vissing et al. | 411/457 |
| 3,373,646 | 3/1968 | Ehlert | 411/473 |
| 3,741,068 | 6/1973 | Andemskiewicz | 52/712 |
| 3,813,985 | 6/1974 | Perkins . | |
| 3,821,919 | 7/1974 | Knohl . | |
| 3,875,648 | 4/1975 | Bone | 29/417 |
| 3,885,491 | 5/1975 | Curtis . | |
| 3,945,293 | 3/1976 | Krol . | |
| 3,969,975 | 7/1976 | Krol . | |
| 4,131,975 | 1/1979 | Niedecker | 24/30.5 |
| 4,923,350 | 5/1990 | Hinksman et al. | 411/452 |
| 4,925,141 | 5/1990 | Classen | 248/217.2 |
| 4,949,929 | 8/1990 | Kesselman et al. | 240/300 |
| 5,027,573 | 7/1991 | Commins et al. | 52/489 |
| 5,222,975 | 6/1993 | Crainich | 52/489 |
| 5,333,979 | 8/1994 | Raffoni | 411/477 |

FOREIGN PATENT DOCUMENTS

| | | | |
|---|---|---|---|
| 443789 | 1/1949 | Italy . | |
| 776390 | 6/1957 | United Kingdom | 411/458 |

*Primary Examiner*—Neill Wilson
*Attorney, Agent, or Firm*—Fish & Richardson P.C.

[57] ABSTRACT

A fastener for securing boards to joists includes first and second sharp, pointed prongs. The first prong has a driving portion for driving the prong at an angle through a first board and a joist thereunder. The second prong extends from a lateral member connected to the driving portion of the first prong, defining an angle between the first prong and the second prong in the range of about 30 to 60 degrees. The second prong acts to secure an adjacent board to the first board. In another aspect, a fastener for securing boards to joists thereunder includes a first member having two parallel sharp, pointed prongs, and a third sharp, pointed prong extending from the first member at an angle in the range of about 35–55 degrees One of the prongs of the first member is driven into a first board and the other of the prongs is driven into the joist. The third prong secures an adjacent board to the first board.

7 Claims, 4 Drawing Sheets

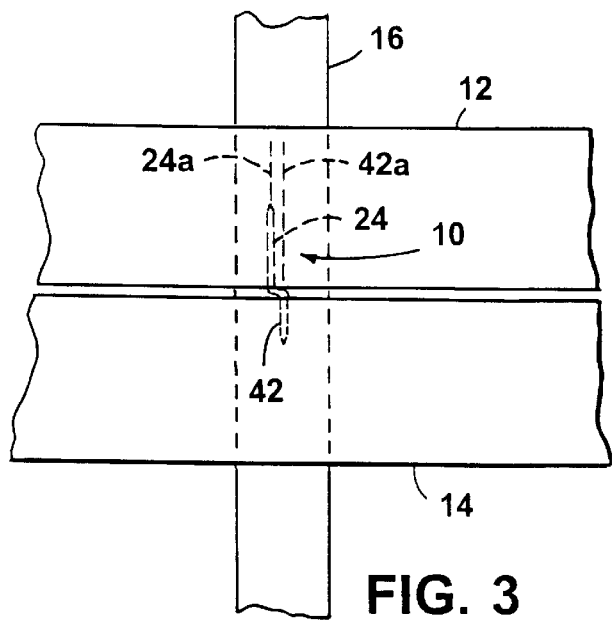
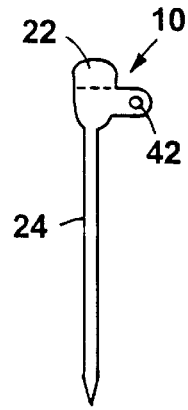
FIG. 3
FIG. 3A
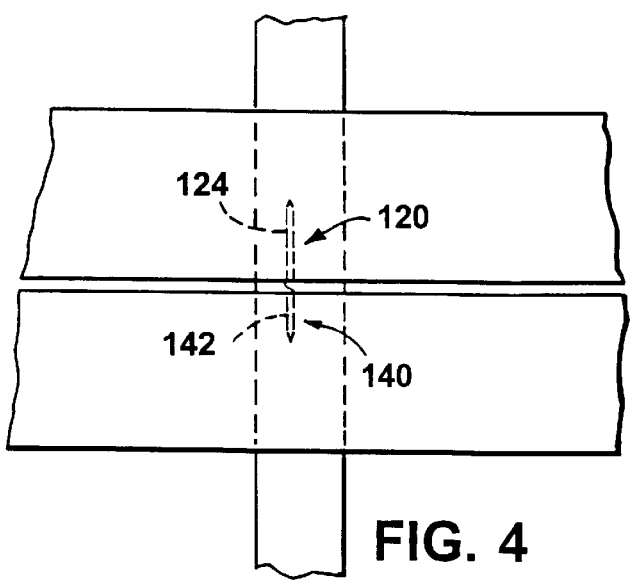
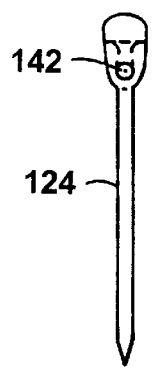
FIG. 4
FIG. 4A

DECK FASTENERS

BACKGROUND OF THE INVENTION

This invention relates to deck fasteners

Brackets, clips, and anchors for securing boards to joists without nail heads protruding from the deck surface are known. These securing devices require an additional fastener to secure them to the boards and/or joists.

SUMMARY OF THE INVENTION

According to the invention, a fastener for securing boards to joists includes first and second sharp, pointed prongs. The first prong has a driving portion for driving the prong at an angle through a first board and a joist thereunder The second prong extends from a lateral member connected to the driving portion of the first prong, defining an angle between the first prong and the second prong in the range of about 30 to 60 degrees, preferably about 45 degrees. The second prong acts to secure an adjacent board on top of the joist to the first board.

In preferred embodiments, the second prong includes a head portion and a shank with the shank being at an angle of about 90 degrees to the head portion. The first prong has an extended length lying in a first plane and the second prong has an extended length lying in a second plane parallel to and offset from the first plane. The first prong has a length in the range of about 1 to 3 inches, and the second prong has a length in the range of about ¼ to 1 inch. The first and second prongs have diameters in the range of about 1/16 to ¼ inch.

According to another aspect of the invention, a fastener for securing boards to joists thereunder includes a first member having two parallel sharp, pointed prongs, and a third sharp, pointed prong extending from the first member at an angle in the range of about 35–55 degrees, preferably 45 degrees. One of the prongs of the first member is driven into a first board and the other of the prongs is driven into the joist. The third prong secures an adjacent board on top of the joist to the first board.

In preferred embodiments, the prongs of the first member have lengths in the range of about ½ to 2 inches, and the third prong has a length in the range of about ¼ to 1 inch. The prongs of the first member and the third prong have diameters in the range of about 1/16 to ¼ inch.

According to another aspect of the invention, a method of securing boards to joists thereunder includes driving a first sharp, pointed prong at an angle through a first board and a joist thereunder to secure the first board to the joist, and driving an adjacent board positioned on top of the joist against a second sharp, pointed prong extending from a lateral member connected to the driving portion of the first prong, defining an angle between the first prong and the second prong in the range of about 30–60 degrees, to secure the adjacent board to the first board.

According to another aspect of the invention, a method of securing boards to joists thereunder includes driving a first member having two parallel sharp, pointed prongs into a first board and into a joist thereunder such that one of the prongs enters the first board and the other of the prongs enters the joist, and driving an adjacent board positioned on top of the joist against a third sharp, pointed prong extending from the first member at an angle in the range of about 35–55 degrees to secure the adjacent board to the first board.

Advantages of the invention include the lack of nail heads protruding from the deck surface, and, as compared to existing brackets, clips, and anchors, fewer steps to secure boards to joists resulting in a savings in labor, ease of manufacture, and single piece construction.

BRIEF DESCRIPTION OF THE DRAWINGS

FIG. 3 is a top view of an embodiment of the FIG. 1 nail shown securing adjacent floorboards to a joist;

FIG. 3A is a side view of the FIG. 1 nail, taken along lines 3A—3A of FIG. 2;

FIG. 4 is a top view of another embodiment of the nail shown securing adjacent floorboards to a joist;

FIG. 4A is a side view of the nail, taken along lines 4A—4A of FIG. 2;

DESCRIPTION OF THE PREFERRED EMBODIMENTS

Figure 1:
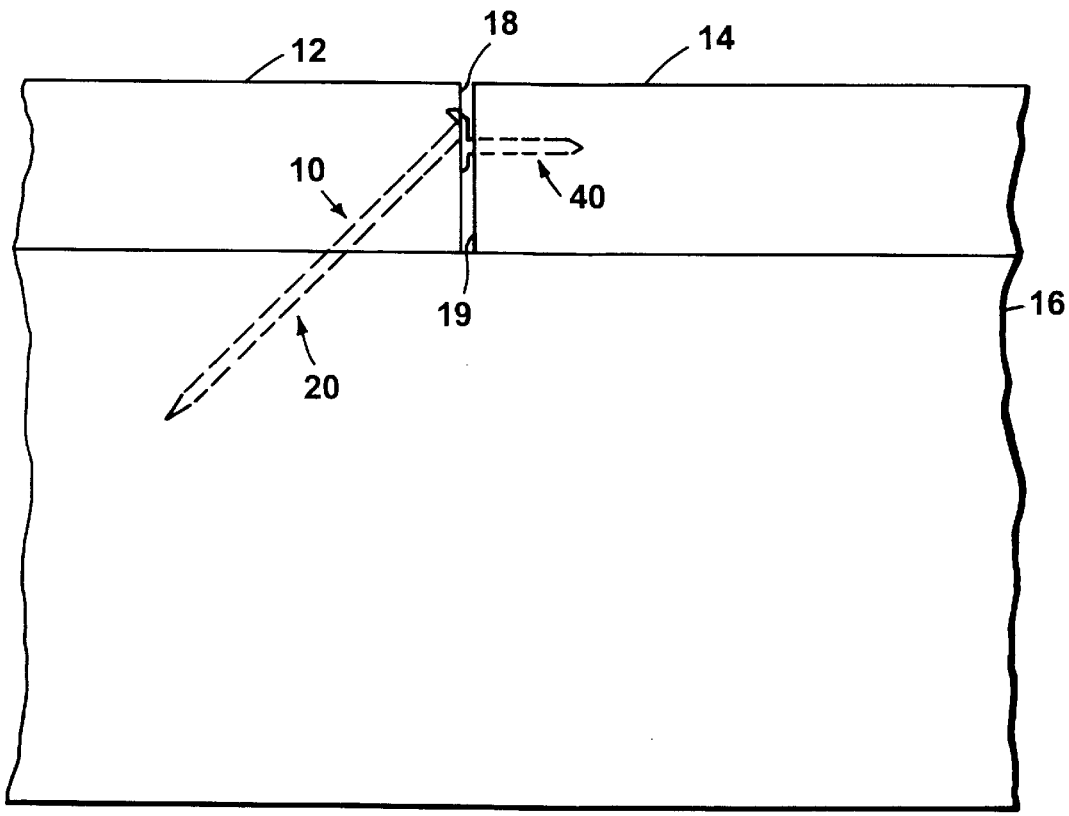
FIG. 1 shows a nail according to the invention securing adjacent floorboards to a joist.
Figure 2:
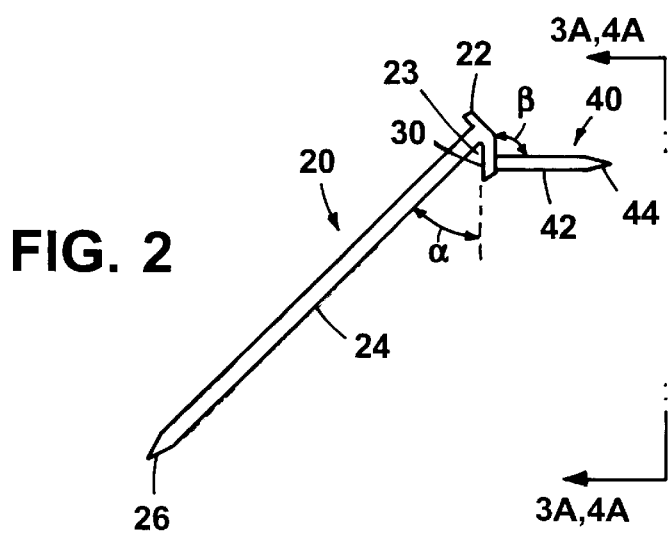
FIG. 2 shows the nail of FIG. 1.

Referring to FIG. 19 a nail 10 for fastening boards 12, 14 to a joist 16 thereunder includes a first prong 20 and a second prong 40. Referring also to FIG. 2, first prong 20 includes a head 22 for driving prong 20 through an edge 18 of board 12 and down into joist 16.

Prong 40 includes a shank 42 oriented at an angle α in the range of about 30 to 60 degrees, preferably about 45 degrees, to a shank 24 of prong 20, and at an angle β of about 90 degrees to a head 30 of prong 40. Head 30 is connected to head 22, defining lateral member 23. Shanks 24 and 42 have sharp, pointed tips 267 44, respectively. After joining of board 12 to joist 16 with prong 20, adjacent board 14 is hammered into place driving prong 40 into edge 19 of board 14. Preferably, prong 40 is positioned after joining of board 12 to joist 16 to be approximately centered on edge 19 of board 14.

Referring to FIGS. 3 and 3A, in a particular embodiment of nail 10, shank 24 of prong 20 lies along a first plane 24a and shank 42 of prong 40 lies along a second plane 42a parallel to and offset from plane 24a. In an alternative embodiment of nail 10, shown in FIGS. 4 and 4A, a shank 142 of a prong 140 is positioned in-line with respect to a shank 124 of a prong 120.

Shank 42 of prong 40 has a length, e.g., in the range of about ¼ to 1 inch; shank 24 of prong 20 has length, e.g., in the range of about 1 to 3 inches; and shanks 24 and 42 have diameters, e.g., in the range of about 1/16 to ¼ inch.

Figure 5:
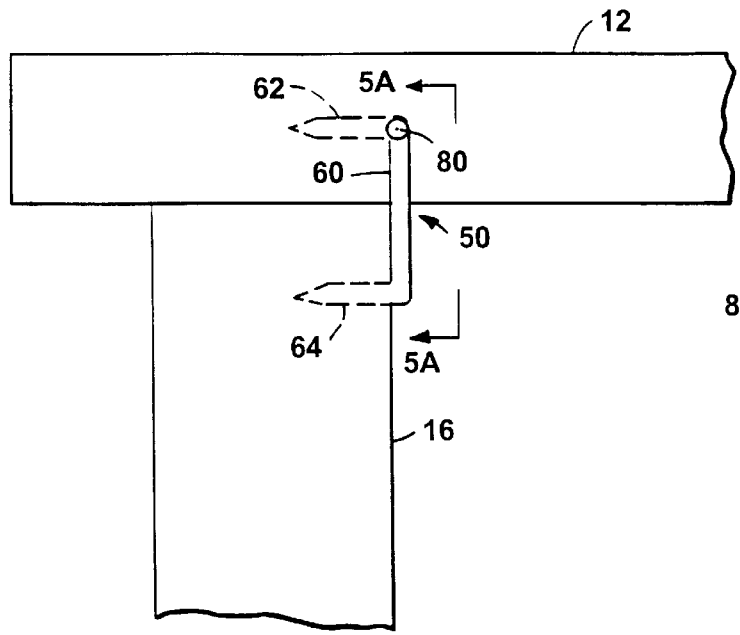
FIG. 5 shows a staple according to the invention securing adjacent floorboards to a joist.
Figure 5A:
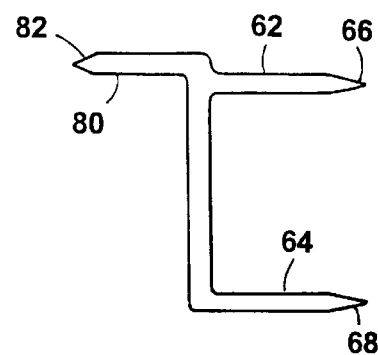
FIG. 5A is a side view of the staple of FIG. 5, taken along lines 5A—5A of FIG. 5.

Referring to FIGS. 5 and 5A, a staple 50 for fastening boards 12, 14 to a joist 16 thereunder includes a U-shaped member 60 having two parallel prongs 62, 64, and a third prong 80. Prong 62 is driven into board 12 while prong 64 is driven into joist 16.

Figure 6:
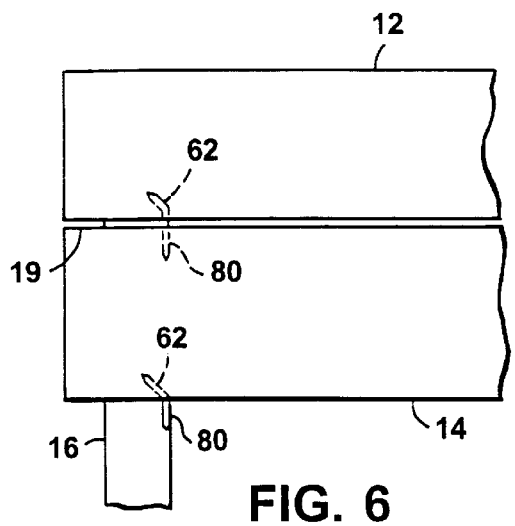
FIG. 6 a top view of the staple shown securing adjacent floorboards to a joist.
Figure 7:
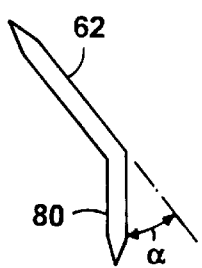
FIG. 7 is a top view of the staple of FIG. 5.

As shown in FIGS. 6 and 7, prong 80 is oriented at an angle γ the range of about 35 to 55 degrees, preferably about 45 degrees, to prong 62. Prongs 62, 64, and 80 have sharp, pointed tips 66, 68, 82, respectively. After joining of board 12 to joist 16 with prongs 62, 64, adjacent board 14 is hammered into place driving prong 80 into edge 19 of board 14 Preferably, prong 80 is positioned after joining of board 12 to joist 16 to be approximately centered on edge 19 of board 14.

Prong 80 has a length, e.g., in the range of about ¼ to 1 inch; prongs 62, 64 have lengths, e.g., in the range of about ½ to 2 inches; and prongs 62, 64, and 80 have diameters, e.g., in the range of about 1/16 to ¼ inch.

Figure 8:
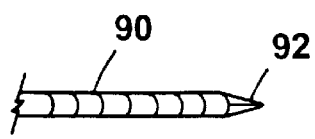
FIG. 8 is a prong tip that can be used in the nails or staples according to the invention.
Figure 8A:
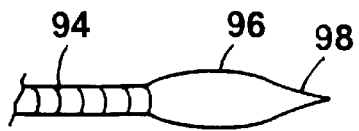
FIG. 8A is an alternative embodiment of a prong tip.

Nail 10 and staple 50 can be made from, e.g., steel or stainless steel wire. The prong dimensions can be varied to accommodate the particular board and joist sizes. FIGS. 8 and 8A show two embodiments of prong tips 26, 44, 66, 68, and 82. In FIG. 8, a round wire 90 is shown with a pointed tip 92, and in FIG. 8A, a round wire 94 is shown with a flattened end 96 forming a chisel point 98.

Figure 9:
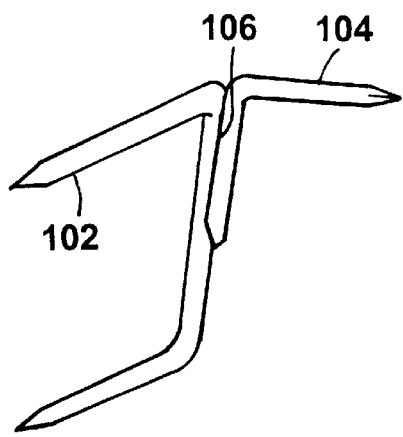
FIG. 9 shows an embodiment of the staple of FIG. 5.
Figure 9A:
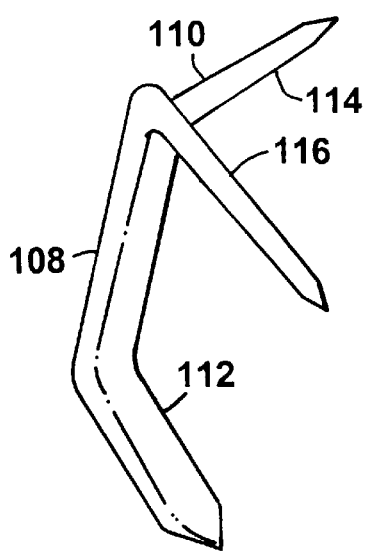
FIG. 9A is an alternative embodiment of the staple of FIG. 5.
Figure 9B:
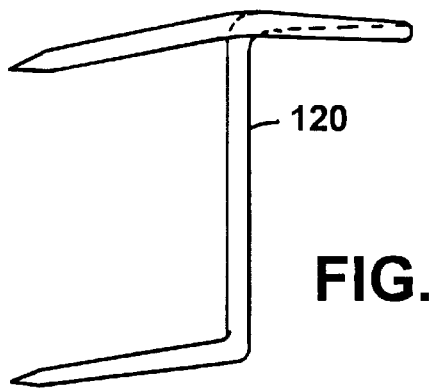
FIG. 9B is another alternative embodiment of the staple of FIG. 5.

Various ways of forming staple 50 are shown in FIGS. 9–9B. In FIG. 9, preshaped first and second stainless steel wires 102, 104 are joined at 106. In FIG. 9A, a uniform width piece of steel 108 is cut along edge 110 and split such that portion 112 is twice the width of prongs 114 and 160 In FIG. 9B, a single length of round wire 120 is bent into shape.

The invention provides fasteners for joining boards to joists without nail heads protruding from the deck surface. The fasteners result in a savings in labor because the joining requires fewer steps as compared to existing brackets, clips, and anchors. The fasteners of the invention are also easier to manufacture and are of a single piece construction as compared to existing brackets, clips, and anchors which require an additional fastener to secure them.

What is claimed is:

1. Fastener for securing boards to joists thereunder, comprising:

a first sharp, pointed prong with a driving portion for driving said first prong at an angle through a first board and a joist thereunder, a lateral member extending from the driving portion of said first prong, and a second sharp, pointed prong extending from said lateral member, defining an angle between said first prong and said second prong of about 30 to 60 degrees, for securing an adjacent board on top of said joist to the first board, where said first prong has an extended length lying in a first plane and said second prong has an extended length lying in a second plane parallel to and offset from said first plane.

2. Fastener for securing boards to joists thereunder, comprising:

a first sharp, pointed prong with a driving portion for driving said first prong at an angle through a first board and a joist thereunder, a lateral member extending from the driving portion of said first prong, and a second sharp, pointed prong extending from said lateral member, defining an angle between said first prong and said second prong of about 30 to 60 degrees, for securing an adjacent board on top of said joist to the first board.

3. The fastener of claim 1 wherein said second prong includes a head portion and a shank, said shank being at an angle of about 90 degrees to said head portion.

4. The fastener of claim 1 wherein said second prong extends from said lateral member, defining an angle between said first prong and said second prong of about 45 degrees.

5. The fastener of claim 1 wherein said first prong has a length in the range of about 1 to 3 inches, and said second prong has a length in the range of about ¼ to 1 inch.

6. The fastener of claim 1 wherein said first and second prongs have diameters in the range of about 1/16 to ¼ inch.

7. A method of securing boards to joists thereunder, comprising:

driving a first sharp, pointed prong at an angle through a first board and a joist thereunder to secure the first board to the joist, and driving an adjacent board positioned on top of said joist against a second sharp, pointed prong extending from a lateral member connected to said first prong to secure the adjacent board to the first board, where said first prong and said second prong define an angle therebetween in the range of about 30–60 degrees.

\* \* \* \* \*

UNITED STATES PATENT AND TRADEMARK OFFICE
CERTIFICATE OF CORRECTION

PATENT NO. : 5,927,923
DATED : July 27, 1999
INVENTOR(S) : Glen J. Tebo

It is certified that error appears in the above-identified patent and that said Letters Patent is hereby corrected as shown below:

Title page,
Insert -- Related US Application Data
Item [63], Divisional of application no. 08/667,389, June 21, 1996 --.

Column 1,
Line 1, insert -- This is a divisional of U.S. Application Serial No. 08/667,389, filed June 21, 1996. --
Line 67, after "as compared to", delete "30".

Column 2,
Line 37, after "FIG.", delete "19", and insert -- 1 --.
Line 49, after "pointed tips", delete "267", and insert -- 26, --.

Signed and Sealed this

Sixth Day of November, 2001

*Attest:*

*Attesting Officer*

NICHOLAS P. GODICI
*Acting Director of the United States Patent and Trademark Office*